United States Patent [19]

Gajewski

[11] 4,251,561

[45] Feb. 17, 1981

[54] LOW-MOISTURE, FRANGIBLE AERATED CONFECTIONS AND METHOD OF PREPARATION

[75] Inventor: Robert J. Gajewski, Crystal, Minn.

[73] Assignee: General Mills, Inc., Minneapolis, Minn.

[21] Appl. No.: 45,036

[22] Filed: Jun. 4, 1979

[51] Int. Cl.$^3$ .............................................. A23G 3/00
[52] U.S. Cl. .................................. 426/571; 426/572; 426/576; 426/568; 426/658; 426/660; 426/104
[58] Field of Search ............... 426/571, 572, 576, 658, 426/660, 568, 104

[56] References Cited

U.S. PATENT DOCUMENTS

| | | | |
|---|---|---|---|
| 3,018,183 | 1/1962 | Downey | 426/571 |
| 3,062,661 | 11/1962 | Doumah | 426/571 |
| 3,607,309 | 9/1971 | Olney | 426/571 |
| 3,976,803 | 8/1976 | Koppijn | 426/571 |
| 4,018,901 | 4/1977 | Hayward | 426/571 |
| 4,120,987 | 10/1978 | Moore | 426/571 |

OTHER PUBLICATIONS

Barnett, The Art & Science of Candy Making, Mag. for Industry, N.Y., pp. 147-158, 1978.
Johnson et al., Encyclopedia of Food Tech., Air Pub. Co., Westport, Conn., 1974, pp. 253-258.
Leon, An Encyclopedia of Candy & Ice Cream Making, Chem. Pub. Co., N.Y., 1959, pp. 294-305.
Leighton, A Text Book on Candy Making, Manuf. Conf. Pub. Co., Oak Pk., Ill., 1952, pp. 55-60.

*Primary Examiner*—Jeanette M. Hunter
*Attorney, Agent, or Firm*—Gene O. Enockson; John A. O'Toole

[57] ABSTRACT

Disclosed are aerated, dextrose-based confections and methods for their preparation. The confections essentially comprise from about 87% to 99% dextrose, from about 0.5% to 3% whipping agent and from about 0.5% to 7% moisture. In one method for making the confection, a confection melt is prepared from melted dextrose monohydrate and a whipping agent such as hydrated gelatin. The confection melt of specified temperature range (190° F. to 270° F.) is pumped through a whipper so as to aerate the mixture to particular densities (0.2 to 1.0 g./cc.). The composition is simultaneously cooled to achieve particular whipper exit temperatures (160° F. to 220° F.). The aerated confection is then formed into pieces of desired shape and size and thereafter cooled. One embodiment of the aerated confection is suitable for use as blackboard chalk.

23 Claims, No Drawings

LOW-MOISTURE, FRANGIBLE AERATED CONFECTIONS AND METHOD OF PREPARATION

BACKGROUND OF THE INVENTION

1. Field of the Invention

The present invention relates to aerated confections and to their methods of preparation. More particularly, the present invention relates to low moisture, highly crystalline aerated confections substantially free of either fats or milk-based components. One embodiment of the present invention is a three-dimensional confectionary product having a child-oriented utility.

2. The Prior Art

Confections are broken down into three major groups: hard candies, chewing confections, e.g., kisses, gums and jellies, and aerated or whipped items, e.g., nougats and marshmallows. Both chewy and aerated confections can be further classified into two sub-groups, grained and non-grained candies. Grained candies are made from supersaturated sucrose solution while non-grained candies are made from unsaturated sucrose solutions.

The basic composition for marshmallows of all kinds includes water, a disaccharide sugar such as sucrose, a monosaccharide sugar such as dextrose or corn syrup, and a whipping agent such as gelatin. Suitable flavor and coloring matrials may also be incorporated into the basic composition. Among the many formulas that are known for marshmallow production are those found in the following: "Candy Making as a Science and as an Art," by Claude D. Barnett, Don Gussow Publications, Inc., New York, 1960, pp. 99–103; "An Encyclopedia of Candy and Ice Cream Making," by Simon I. Leon, Chemical Publishing Company, New York, 1969, pp. 294–304; and, "A Textbook on Candy Making," by Alfred E. Leighton, The Manufacturing Confectioner Publishing Company, Oak Park, Ill., 1952, pp. 55–58. See also, for example, U.S. Pat. No. 3,607,309 (issued Sept. 21, 1961 to E. S. Olney et al).

Accordingly, the compositions of the present invention are to be distinguished from other such confections as chiffons, nougats and fudges. Chiffons typically have lower densities than the present compositions. Further, chiffons are not frangible. Nougats and fudges are to be distinguished from the present compositions by virtue of the substantial presence of either oleaginous or milk-based materials.

Soft marshmallow or "long grain" marshmallow has an elastic and chewy consistency and is the type usually associated with the term "marshmallow". Sugar ratios are so regulated so that crystallinization of the sugars or "graining" does not take place within a reasonable period of time. To accomplish this reduction in the tendency to crystallize, corn syrup of various dextrose equivalents ("DE") have been employed to inhibit the onset of crystallinization. Hard marshmallows or "short grain" marshmallows, on the other hand, have a rigid consistency and are composed of suitable sugars in ratios such that one or more of the disaccharide sugars will crystallize and provide a grained structure. Examples of such compositions are the candy-kisses popular in small, heart-shaped candies which are popular for Valentine's Day.

Thus, short grain marshmallows and, to some extent, even long grain marshmallows have been prepared in the past containing some low levels of dextrose. Confections desirably contain high levels of dextrose based upon dextrose's properties. It is generally known that dextrose is a vital sugar, that is to say, this monosaccharide is directly absorbed by the blood. Further, it is known that dextrose aids fattening to a lesser extent than sucrose.

However, in the conventional recipe for marshmallows, 24% by weight dextrose is considered to be the maximum. The art teaches that when dextrose usage exceeds this level, the texture of articles prepared becomes gritty or undesirably hygroscopic. Art efforts have included attempts at realizing marshmallows containing up to 50% dextrose (see, for example, U.S. Pat. No. 3,976,803 issued Aug. 24, 1976 to H. J. Koppijn). Typically, in the manufacture of short grain marshmallows, the art has considered as essential that sucrose comprise the greater part of the sugars component in order to induce precipitation (see, for example, "Encyclopedia of Food Technology," ed. by M. S. Peterson and A. H. Johnson, The Avi Publishing Company, Inc., 1974, pp. 255–258).

Preparation of these marshmallows containing higher levels of dextrose employ the traditional method of soft marshmallow preparation: formulating a marshmallow syrup by dissolving the sugars in an excess of water; whipping the blend to form an aerated whip of desired density and extruding into shaped starch or starch lined molds and drying or "curing" for extended periods. After drying, the marshmallows typically comprise about 16% to 30% moisture by weight.

The starch drying of the marshmallow necessitated by employing excess water to initially dissolve the sugars is both laborious and time consuming. Regeneration of the starch is an inconvenient yet necessary operation in commercial marshmallow production. To eliminate such steps, marshmallow formulas and techniques have been attempted which reduce the amount of water required to prepare the confections. Reduction in the amount of water required to obtain the solution of the sugars has been attempted by substantially reducing the dextrose contribution and dissolving the sucrose in the corn syrup itself. (See, for example, U.S. Pat. No. 3,062,661 issued Nov. 6, 1962 to A. J. Doumak). Thus, increased dextrose employment in marshmallows is at odds with attempts to eliminate the onerous starch drying steps required by excess water usage needed for sugars dissolution.

Given the state of the prior art as described above, there is a continuing need for aerated confections, particularly grained marshmallows, containing high levels of dextrose. Accordingly, it is an object of the present invention to provide aerated confections containing high levels of dextrose and which are acceptable for consumer sale.

It is a further object of the present invention to provide methods of preparing aerated confections containing high levels of dextrose which do not require a starch drying step.

It is a further object of the present invention to provide low moisture, aerated confections containing high levels of dextrose as well as methods for their preparation which do not require starch drying.

It has been surprisingly discovered that the above objectives can be realized and superior confections provided by formulating aerated confections substantially comprising dextrose and a whipping agent, and containing low moisture levels.

The coined word "mardexx" where used herein refers to the aerated, frangible, low-moisture compositions of the present invention which comprise principally dextrose. In its plural usage, "mardexxes" will generally connote small (e.g., approximately 0.5 g.) shaped quantities of the present compositions which generally will have low densities.

Most surprisingly, it has been discovered that the edible compositions of the present invention can be formed into articles which can be used to write on blackboards. Even more surprisingly, on certain blackboard surfaces, articles prepared from compositions of the present invention exhibit superior writing properties. Thus, since the present compositions are edible and have relatively low densities, blackboard chalk prepared therefrom would find utility in child-oriented applications. The coined term "mardexx chalk" will be used herein to denote higher density compositions of the present invention suitable for writing on a blackboard and will generally connote a cylindrical article having a size of conventional blackboard chalk.

SUMMARY OF THE INVENTION

The present invention is based in part upon the discovery that an aerated, frangible confection which is both low in moisture and non-hygroscopic or efflorescent can be prepared from formulations comprising dextrose, a whipping agent, and particular moisture contents. In its methods aspect, the present invention relates to a method of preparing low-moisture, aerated confections which do not require elaborate starch drying steps. The present method of preparation comprises the steps of forming a confection melt comprising melted dextrose, a whipping agent and particular moisture levels; aerating the confection melt to particular densities while simultaneously cooling to particular temperatures; and cooling the aerated confections to room temperatures while drying to particular moisture contents.

DETAILED DESCRIPTION OF THE INVENTION

The present invention relates to low moisture, frangible aerated confections. The present compositions essentially comprise high levels of dextrose and low levels of whipping agents and moisture. There is further provided herein processes by which the present aerated confections are prepared. Each of these aerated confection components and properties as well as product preparation and product use are described in detail as follows.

Unless otherwise indicated, throughout the specification and claims, all percentages are based upon the weight of the final aerated confections and temperatures are in degrees Fahrenheit.

A. Dextrose

The present compositions essentially comprise from about 87% to 99% of dextrose. Better compositions are obtained when dextrose is present at from about 90% to 99%. Best results are obtained when the dextrose is present at about 95% to 99%.

Dextrose, of course, comprises the principal component of the present compositions. While frangible aerated confections have been prepared in the past containing some dextrose, e.g., up to 25% by weight of the sugar component, it is believed that heretofore no frangible aerated confection has been realized comprising such high levels of dextrose. In its finished form, the present compositions will comprise dextrose in a polycrystalline, prinicipally anhydrous state.

Dextrose is commercially available both as dextrose monohydrate and as dextrose anhydrate. In the present method of preparation, it is preferred that the dextrose component be supplied from dextrose monohydrate. Dextrose monohydrate is less expensive than dextrose anhydrate and supplies sufficient moisture in its water of hydration to achieve fluidization of the dextrose at low temperatures without requiring addition of water.

Small amounts of other sugars or "nutritive carbohydrate sweetening agents", e.g., fructose, glucose or sucrose can be substituted for the dextrose component. However, since the present method of preparation does not employ the traditional dissolution of the sugars step to achieve sugar fluidization, the substituted sugars are generally not totally dissolved but are carried along as inert solid materials. Accordingly, the non-dextrose sugars should comprise no more than about 10% by weight of the present compositions. Also, since these non-dextrose sugars are not totally dissolved in the present method of composition preparation, it is important to restrict the particle size to less than about 100 microns.

Corn syrup solids traditionally have been used in the confection art to inhibit the onset of crystallization in aerated confections. Since the present compositions are desirably highly crystalline in character, it is important that corn syrup solids, if present, constitute no more than 5% of the present composition.

B. Whipping Agent

The present compositions also essentially comprise from about 0.3% to 3% of a whipping agent. Better results are obtained when the whipping agent comprises from about 0.4% to 1.5% by weight of the present compositions. Best results are obtained when the whipping agent is present at about 0.7%. The whipping agent acts as a structuring agent allowing the incorporation of air or other gas into the present crystalline material.

Whipping agents useful in the present compositions are those commonly used in food products, particularly in aerated confections, such as gelatin, protein hydrolyzates and common egg whites. Such whipping agents are well known in the food art, and selection of suitable materials for use herein will pose no problems to the skilled artisan.

Gelatin has commonly been used in the manufacture of marshmallows and is well known generally in the food art (see, for example, "The Macromolecular Chemistry of Gelatin", by Arthur Vein, Academic Press, Inc., 1964, which is incorporated herein by reference). The gelatin can be any of several commercially available gelatins but desirably should be a gelatin having increased whipping properties such as is disclosed in U.S. Pat. No. 2,196,300 (issued Apr. 9, 1940 to Donald P. Grettie) which is also incorporated herein by reference. The gelatin's gel strength should range from about 150 to 300 g. The gel strength is determined by the Bloom Gelometer in a procedure which has become standardized throughout the industry and is included in the official methods of analysis 21.012, 10th Edition of the Association of Official Analytical Chemists for gelatin and dessert preparations. The Bloom value is expressed in grams and represents a weight required to impress an 0.5-inch diameter flat plunger 4 mm. into the surface of a jelled sample made under prescribed conditions. Better results are achieved when the Bloom strength is between about 200 g. to 300 g. Best results are achieved when the Bloom strength is between about 250 g. and 300 g. Generally, less gelatin is required when gelatins having high Bloom strengths are employed. Conversely, more gelatin is required when low Bloom strength gelatin is employed in the present compositions. Generally, the same results occur when other types of whipping aids are employed.

For a given level of gelatin usage, the Bloom strength of the gelatin will affect the density of the finished aerated confection. When a high Bloom strength gelatin is used, usually more aeration occurs leading to a lighter density product. Such lighter density products typically are more frangible. Conversely, if a lower strength gelatin is used, less aeration is generally achieved which reduces aeration results in a higher density product. Such higher density products are usually less frangible.

By controlling the level of gelatin employed as well as its strength, products of the present invention can be easily realized by the skilled artisan which are particularly suited for various utilities. Thus, for example, mardexx bits which are particularly suitable for addition to ready-to-eat cereals are realized when the present compositions contain from about 0.5% to 1.3% of gelatin having a Bloom strength ranging from about 250 g. to 300 g. Mardexx chalk can be prepared from compositions of the present invention which contain from about 0.4% to 1.0% of gelatin having a Bloom strength ranging from about 200 to 300 g.

Other suitable whipping agent materials can be derived as protein hydrolyzates from, for example, caseinate, whey (see, for example, U.S. Pat. No. 4,089,987 issued May 16, 1978 to P. K. Chang and incorporated herein by reference), and various vegetable proteins. The soy protein hydrolyzates dislclosed in U.S. Pat. No. 3,814,816 (issued June 4, 1974 to R. C. Gunther, incorporated herein by reference) are particularly effective whipping proteins and are useful as the present whipping agents. These proteins are commercially available from Staley Manufacturing Co., Decatur, Ill., and are prepared by initially chemically hydrolyzing the soy protein to a prescribed viscosity range and, thereafter, enzymatically hydrolyzing the soy protein with pepsin to produce a pepsin modified hydrolyzed soy protein whipping agent. Confections of various desired densities can readily be realized by manipulating the protein hydrolyzate levels in a manner analagous to when gelatin is employed as the whipping agent.

C. Moisture Content

The present compositions have moisture contents ranging from about 0.5% to 7%. Preferred compositions of the present invention have moisture contents of less than about 2%. Such low-moisture content levels insure that the water activity ("$A_w$") of the present invention is less than about 0.75 and thus are stable against microbial growth when stored for extended periods. Also, when compositions containing excess water are extruded from shaped dies, as explained in more detail below, the shaped extrudate exhibits insufficient dimensional stability to retain the desired geometric configuration.

While not wishing to be bound by any theory expressed herein, it is believed that the present low moisture levels herein are obtained since the dextrose contained in the present compositions generally exits in a polycrystalline anhydrous state rather than in a glassy state with a 1:1 molar water of hydration ratio. What little residual (e.g., 5%) water remaining in the present compositions initially after preparation is slowly released, i.e., the present confections are actually efflorescent. Such a water-release propensity is indicative of the highly non-hygroscopic properties of the present aerated confections. Hygroscopic confections are undesirable since upon storage they tend to absorb atmospheric moisture unless securely packaged. Moreover, hygroscopic confections can exhibit stickiness induced by surface absorption of skin moisture upon handling. Accordingly, since the present compositions do not absorb atmospheric moisture in open storage nor upon normal handling, they are especially and surprisingly suitable for use as an edible blackboard chalk, for example.

D. Specific Gravity

The extent to which the present aerated confections incorporate air (or other inert gas) can be expressed by the density or the specific gravity of the present compositions. Thus, the specific gravity of the present compositions ranges from about 0.2 to 1.0.

The extent of aeration and thus the specific gravity is dependent in part upon the quality and quantities of whipping agents employed as discussed above. For a given composition, particular specific gravities are obtained by controlling air incorporation in known manner as described more fully below.

In one embodiment of the present invention, products are realized which are particularly suitable for addition to prepackaged ready-to-eat cereals. In this embodiment, the aerated confections are generally characterized by specific gravities preferably between about 0.2 and 0.5. Specific gravities within this range ensure that the products are both highly buoyant and highly frangible. As such highly buoyant, frangible and sweet compositions, they have strong appeal to children.

In another embodiment of the present invention, products are realized which, most surprisingly, can be used to write upon blackboards. Notwithstanding, the utility as a composition which can be made into a writing instrument, these same products are nonetheless edible. Such compositions thus are highly beneficial for use in schools as non-toxic blackboard chalk. In this embodiment of the present invention, it is desirable to employ compositions having specific gravities preferably ranging from about 0.55 to 0.9. Maintenance of specific gravities within this range is important to the provision of compositions which are sufficiently non-brittle to be used for blackboard chalk. Of course, this embodiment too is both bouyant and frangible differing from the cereal-additive embodiment only in degree.

E. Optional Ingredients

The present confections can optionally contain a variety of additional ingredients suitable for rendering such food products more organoleptically or aesthetically desirable. Such optional components include, for example, flavors, dyes, coloring agents, vitamins, preservatives and the like. If present, such minor optional components should comprise from about 0.1% to 1.5%. In selecting such ingredients, preferably only small amounts of hydrophobic material should be used.

One highly preferred optional component is the natural chocolate flavorant of cocoa. Cocoa can have a significant fat component. High fat cocoa has at least 22% by weight cocoa fat. Conventional cocoa contains between 10% and 22% cocoa fat. However, the present confection compositions should have less than about 0.5% by weight of total fat to insure the desirable crisp structure and to insure that the compositions are suitable for the surprising blackboard "chalk" utility. Fortunately, low-fat cocoa (i.e., less than 10% by weight) is commercially available and such low-fat cocoa is highly preferred for use herein as a cocoa flavorant.

Conventional milk-based confection optional ingredients such as non-fat milk solids are to be avoided in the present compositions. That is, the present compositions are substantially free (i.e., are present at no more than 0.5% by weight) of such milk-based ingredients. While the precise phenomenon is not understood, it has been surprisingly discovered that the presence of such ingredients even at low levels undesirably interferes with the provision of a highly frangible confection.

COMPOSITION PREPARATION

The present aerated confections can be prepared by heating the dextrose monohydrate with a whipping agent to form a confection melt, aerating the confection melt to particular densities and allowing the aerated confection to cool while drying to particular moisture contents. Each of these processes of preparation are described in detail below.

A. Forming a Confection Melt

In the present method of confection preparation, a confection melt is first formed comprising the dextrose, the whipping agent and moisture as well as any optional ingredients. The confection melt should range between about 190° F. to 270° F. preferably between about 200° F. to 250° F. and most preferably between about 220° F. to 240° F. prior to whipping. In the confection melt the molar ratio of dextrose to water essentially ranges between about 1:0.7 to 1:1.2.

In a preferred embodiment of the present method of confection preparation, the forming of a confection melt can be accomplished by blending the essential and optional ingredients and heating to the essential 190° F. to 270° F. temperature range. Common food application steam heated screw conveyors can be used for concomitantly blending and heating. The conveyors are simply charged with the confection ingredients which are both blended and heated in the screw conveyor. Such a technique for forming the confection melt is particularly advantageous for use when the whipping agent is a finely divided powder such as are the soy or other protein hydrolyzates or egg albumen (dried egg whites).

In another embodiment of the present method of confection preparation, the forming of a confection melt comprises the sub-steps of forming a dextrose melt and blending the dextrose melt with a hot whipping agent to form the confection air. Such a technique for forming a confection melt is particularly advantageous to employ to prepare confections wherein gelatin is used as the whipping agent.

A dextrose melt is prepared by heating dextrose with water in a molar ratio of about 1:0.7 to 1:1.2 until the dextrose fluidizes. Typically, such fluidization will occur about 180° F. when the molar ratio of dextrose to water is about 1:1. Higher temperatures are needed to fluidize the dextrose at higher dextrose to water ratios. The dextrose can be supplied by dextrose monohydrate or by dextrose anhydrate or mixtures thereof. When dextrose anhydrate is used to supply the dextrose, some water must be added to obtain desired dextrose to water weight ratios.

When minor amounts of nutritive carbohydrate sweeteners such as sucrose, fructose or glucose are substituted for a portion of the dextrose component, they can be added to the dextrose melt. Since these additional sugars might not totally dissolve in the dextrose melt, the slurry obtained may require agitation to maintain suspension of the added, particulate sugars. Of course, since these additional suggar(s) might not dissolve in the present method of preparation, it is desirable to employ the sugars having a relatively small particle size, e.g., having an averge particle size of less than about 100 microns.

When gelatin is used as the whipping agent, the gelatin must be hydrated and then melted prior to mixing with the dextrose melt. The gelatin is first hydrated by mixing gelatin with cold water (i.e., water having a temperature less than about 80° F.). The water to gelatin ratio is about 2.5:1 to about 5:1. Maintenance of the water to gelatin ratio within these limits is important for sufficient hydration of the gelatin as well as to the minimization of excess water addition. The gelatin is held in contact with the cold water for a period of between about 15–60 minutes to hydrate. Thereafter the hydrated gelatin is heated to a temperature between about 150° F. to 212° F. to form a gelatin melt. The gelatin melt can then be added to the dextrose melt to form a confection melt. Maintenance of the gelatin at these elevated temperatures undesirably degrades the gelatin strength. The gelatin degradation becomes increasingly pronounced with the more elevated temperatures and with longer times. Accordingly, the confection melt should be aerated promptly (i.e., with about 0.1 to 150 minutes) after the confection melt is prepared.

It will be recognized that in commercial processes minor amounts of previously prepared compositions of the present invention might desirably be reworked. If desired, such material which is to be reworked can be conveniently added to the confection melt or to the dextrose melt. If employed, such reworked material is desirably limited to less than about 25% by weight of the melt.

B. Aerating the Confection Melt

The confection melt is then aerated by any suitable means to provide a gas-containing aerated confection having a specific gravity of between about 0.2 and 1.0, i.e., a density of between about 0.2 g./cc. and 1.0 g./cc. at atmospheric pressure. Aeration of the confection melt can be accomplished by injecting gas under pressure into the melt and concurrently whipping the melt. The gas injected into the confection melt must be non-toxic, relatively inert in the presence of the ingredients of the confection melt and substantially insoluble in the melt. Such gases include, for example, air, nitrogen and carbon dioxide. Aeration can also be accomplished by simple whipping to incorporate air at atmospheric pressures.

Aeration of marshmallows is well known to the marshmallow industry and any of the well-known aeration method and techniques are suitable in the present method of preparation so long as such techniques provide the desired density decrease in the confection melt. For this step in the present process, employment of an Oakes type continuous marshmallow mixer and beater or "whipper" is preferred. A full description of such whipping apparatus and techniques of its use is found in U.S. Pat. No. 2,600,569 (issued June 17, 1952 to Earl T. Oakes) which is incorporated herein by reference. The use and operation of the Oakes-type mixer is well known in the marshmallow industry.

In a preferred method of aeration, the confection melt is generally fed into the whipper at a feed temperature of from about 190° F. to 270° F. Compressed air is fed to the whipper at modest pressures, i.e., from about 10 to 150 p.s.i.g. and at room temperatures. The whipper's rotor can operate at between 100 to 500 rpm.

The confection melt while being aerated is simultaneously cooled to a temperature of 160° F. to 220° F. upon exiting the Oakes whipper. The cooling can be accomplished in part by the incorporation of the room temperature (or cooler) gas. Most of the heat transfer can be accomplished by providing the Oakes whipper with cold water jacket. Larger whipping machines can also be equipped with cooling coils.

C. Cooling the Aerated Confection

The aerated confection prepared above can then be extruded through a suitable die to provide the extrudate with any desired geometric configuration. Preferred shaped extruded compositions of the present invention have cross section dimensions between about 1 to 3 centimeters. The discharge temperature ranges between about 160° F. to 220° F., and preferably 170° F. to 200° F. Discharge pressures range between about 10 to 150 p.s.i.g., preferably 30 to 60 p.s.i.g. The extruded aerated confection of the present invention can thereafter be cut to desired size, e.g., from about 0.1 to 50 g., or subjected to further shaping before being cut to desired size. Thereafter, the aerated confections are allowed to cool under ambient conditions to room temperature by natural or forced convection. Upon exiting the die, the aerated compositions of the present invention will have moisture contents typically ranging between about 12% to 5%. As the aerated confection cools to room temperature, the moisture level decreases until it is within the range of about 0.5% to 7% due to the crystallization of the dextrose into dextrose anhydrate. If desired, further cutting or segmenting of the present confections can be made after cooling at room temperature.

The aerated confections so prepared can be packaged in any suitable container in the conventional manner including packets, tubes, cartons, cellophane bags, and boxes. The aerated confection so prepared are crunchy and can be consumed in normal manner. Alternatively, the aerated confections so prepared can be used to write upon most blackboards.

The aerated confections of the present invention are illustrated by the following examples:

EXAMPLE I

The following composition was prepared:

| Ingredients | Weight % |
| --- | --- |
| Dextrose | 96.80% |
| Gelatin[1] | 2.20 |
| Flavor & Coloring | 0.47 |
| Moisture | 0.53 |
| | 100.00% |

[1]Regular grind food grade gelatin having a Bloom strength of 250 g. manufactured by Vyse Gelatin Company, Schiller Park, Ill.

Such a composition was prepared by first mixing approximately 10.8 g. of the gelatin with about 45 g. of cold tap water and allowing the gelatin to hydrate for one hour. Thereafter, approximately 450 g. of dextrose monohydrate (Clintose "A" manufactured by Clinton Corn Processing of Clinton, Iowa) was melted in a metal beaker on a kitchen-type stove. The melted dextrose was heated to 225° F. Then the flavoring and coloring along with the hydrated gelatin were slowly added to the dextrose melt to form the confection melt. The heating was continued so that the mixture remained at about 225° F.

Within two minutes, the confection melt was added to a Hobart Model C-100 mixer and aerated at its high speed setting with a wire whip. The confection melt was whipped to a specific gravity of about 0.9 g./cc. The measured temperature of the aerated confection was 200° F. Immediately thereafter, the aerated confection was transferred to a plastic bag having a hole of about 0.5-inches in diameter. The aerated confection was extruded from the bag into ropes and allowed to cool and effloresce overnight at room temperature. The following day, the now solid product was broken into bite size pieces of about 0.5 g. each. The bit size pieces exhibited a pleasant flavor and a crisp texture. Larger sections of the cooled extrudate ropes were found to write upon a conventional blackboard.

EXAMPLE II

Mardexx chalk having the following composition was prepared:

| Ingredients | Weight % |
| --- | --- |
| Dextrose | 98.2% |
| Gelatin[1] | 0.8% |
| Moisture | 1.0% |
| | 100.0% |

[1]Regular grind food grade gelatin having a Bloom strength of 250 g. manufactured by Gray's Lake Gelatin Company.

Such a composition was prepared in a semi-continuous process by first hydrating 350 g. gelatin by mixing cold water in a ratio of gelatin to water of about 2.5 for one-half hour. A Groen kettle (approximately 5 gallon capacity) equipped with a steam jacket and stirrer was charged with the hydrated gelatin. Approximately 2 p.s.i.g. steam was supplied to the steam jacket. The gelatin was agitated and heated to a temperature of 150° F.

The dextrose melt was prepared by feeding 100 lb. of dextrose monohydrate (Gerelose Brand marketed by Corn Products, Inc.) to a 2¼ Bonnot cooking extruder. The dextrose monohydrate entering the extruder had a temperature of 70° F. The extruder was supplied with steam of approximately 35 p.s.i.g. The exit temperature of the dextrose melt from the extruder was 230° F. The dextrose melt was then fed into a 5-gallon hopper equipped with an agitator (Lightning Mixer, Model 4517). The feed rate of the dextrose melt to the hopper was about 865 g./min. Simultaneously, the molten, hydrated gelatin was fed from the Groen kettle to the hopper at a feed rate of about 20 g./min. using a high pressure Zenith Positive Displacement Pump.

The confection melt formed in the hopper from the dextrose melt and the hot, hydrated gelatin was then pumped into a Model 8 Oakes continuous mixer at a temperature of 215° F. and at a feed rate of about 885 g./min. The Oakes mixer varispeed drive was operated at a rotor rpm. of 500. Compressed air was fed to the Oakes mixer at 40 p.s.i.g. and at a flow rate of 0.001 cu.

ft./min. Cooling water at 50° F. was supplied to the exterior water jacket of the Oakes mixer.

The confection melt after an approximate residence time in the mixer of 60 seconds exited as an aerated confection from an 0.5-inch die manifold at 210° F. as round ribbons. The aerated confection at this point had a density of 0.5 g./cc. and a moisture content of 9%.

The ropes were allowed to cool to room temperature under ambient conditions. Sections of approximately 1 g. and approximately 2-inches in length were formed. After allowing to stand overnight the pieces had a density of approximately 0.5 g./cc. and effloresced to final moisture content. The mardexx chalk was then found to be suitable for writing on conventional blackboards.

EXAMPLE III

A composition of the present invention having the following formulation is prepared:

| Ingredients | Weight % |
| --- | --- |
| Dextrose | 98.74% |
| Egg White Solids[1] | 0.73 |
| Moisture | 0.53 |
| | 100.0% |

[1]Spray dried egg white solids (Marshall Produce Co., Marshall, Minnesota)

Such a composition is prepared in a manner similar to that described in Example II. In this example, however, 90 g. of egg whites were hydrated with 135 g. of tap water by blending in a Waring Kitchen-type blender. The hydrated egg whites were admixed with 30 lb. of dextrose monohydrate and then fed to the extruder. The confection melt exiting the extruder was 265° F. and was fed directly to the Oakes mixer. The aerated confection was discharged from the Oakes mixer at 30 p.s.i.g. and was 190° F. at the exit die manifold. Upon cooling, the aerated confection had a density of approximately 0.8 g./cc.

The edible confection so prepared was found useful as blackboard chalk yet upon consumption exhibited a desirably crisp texture.

EXAMPLE IV

A composition of the present invention having the following formulation was prepared:

| Ingredient | Weight % |
| --- | --- |
| Dextrose | 98.4% |
| Soy protein hydrolyzate[1] | 1.1 |
| Moisture | 0.5 |
| | 100.0% |

[1]D-157A (Gunther Products, a Division of A. E. Staley Manufacturing, Inc.)

Such a composition was produced in a manner similar to that described in Example I. The aerated confection so prepared had a density of approximately 0.45 g./cc. The composition samples were also able to be used as blackboard chalk.

What is claimed is:

1. A low moisture, frangible, non-hydroscopic aerated confection comprising:
   A. from about 87% to 99% by weight of dextrose;
   B. from about 0.3% to 3% by weight of a whipping agent selected from the group consisting of protein hydrolyzates, egg whites and gelatin;
   C. less than about 7% by weight moisture; and wherein the density of the confection is from about 0.2 to 1.0 g./cc.

2. The aerated confection of claim 1 wherein the protein hydrolyzates whipping agent is selected from the group consisting of vegetable protein hydrolyzates, caseinate hydrolyzates, and whey hydrolyzates.

3. The aerated confection of claim 2 wherein the whipping agent is present at from about 0.8% to 1.3% by weight.

4. The aerated confection of claim 3 wherein the dextrose is present at from about 93% to 97% by weight and wherein the moisture content of the confection is less than about 2% by weight.

5. The aerated confection of claim 4 wherein the whipping agent is gelatin.

6. The aerated confection of claim 5 wherein the gelatin has a Bloom strength ranging between about 200 g. to 300 g. and wherein the aerated confection has a density of about 0.2 to 0.5 g./cc.

7. The aerated confection of claim 4 wherein the whipping agent is gelatin, said gelatin having a Bloom strength ranging between about 200 g. to 300 g. and wherein the aerated confection has a density of about 0.55 to 0.9 g./cc.

8. The aerated confection of claim 4 wherein the whipping agent is a soy protein hydrolyzate.

9. The aerated confection of claim 6 wherein the gelatin has a Bloom strength ranging between about 250 g. to 300 g.

10. The aerated confection of claim 4 additionally comprising less than about 5% by weight of the dextrose of a nutritive carbohydrate sweetening agent having an averge particle size of less than about 100 microns.

11. The aerated confection of claim 10 additionally comprising from about 0.1% to 1.5% by weight of a member selected from the group consisting of flavors, dyes, coloring agents, vitamins, preservatives and mixtures thereof.

12. A method for preparing a low-moisture, frangible aerated confection, comprising the steps of:
   A. heating dextrose and water in a molar ratio of dextrose to water of about 1.0:0.7 to 1.0:1.2 and a whipping agent, said whipping agent being selected from the group consisting of protein hydrolyzates, egg whites and gelatin and being in a weight ratio of dextrose of between about 1:100 to 1:20, to a temperature between about 180° F. to 270° F. to form a confection melt;
   B. aerating the confection melt while simultaneously cooling to form an aerated confection melt having a density of about 0.2 g./cc. to 1.0 g./cc., said aerated confection having a temperature of about 170° F. to 220° F.: and
   C. cooling the aerated confection to ambient temperature while drying to a temperature content of less than about 7% by weight of the aerated confection.

13. The method of claim 12 wherein the protein hydrolyzates whipping agent is selected from the group consisting of vegetable protein hydrolyzates, caseinate hydrolyzates, and whey hydrolyzates.

14. The method of claim 13 wherein the vegetable protein hydrolyzate is selected from the group consisting of soy protein hydrolyzates and whey protein hydrolyzates.

15. The method of claim 13 wherein the whipping agent is gelatin.

16. The method of claim 15 additionally comprising the steps of:
  A. mixing gelatin and water in a ratio of water to gelatin of between about 2.5:1 to 5:1, said water having a temperature of less than 80° F. for about 15-60 minutes to form hydrated gelatin; and
  B. heating the hydrated gelatin to about 150° F. to 212° F. to form the whipping agent.

17. The method of claim 16 wherein the gelatin has a Bloom strength between about 150 g. to 300 g.

18. The method of claim 17 wherein the confection melt is aerated with the gas having a pressure of between about 10 to 150 p.s.i.g.

19. The method of claim 18 wherein the gas is selected from the group consisting of air, nitrogen, and carbon dioxide.

20. The method of claim 19 wherein the confection melt is aerated within a period of between about 0.1 to 150 minutes.

21. The method of claim 20 wherein the dextrose and water are supplied from dextrose monohydrate.

22. The method of claim 21, additionally comprising the step of:
  A. extruding the aerated confection at a temperature of about 170° F. to 220° F. to form a shaped extrudate having a cross-section dimension of between about 1 to 3 cm. and thereafter cooling the aerated confection to room temperature.

23. The method of claim 22 additionally comprising the step of:
  A. cutting the shaped extrudate to form extrudate pieces of between about 0.2 to 50 g.

* * * * *